June 27, 1967  L. L. FLAHERTY, SR  3,328,171
PROCESS OF PRESERVING AN ANIMAL CARCASS
Filed Jan. 24, 1964  2 Sheets-Sheet 2
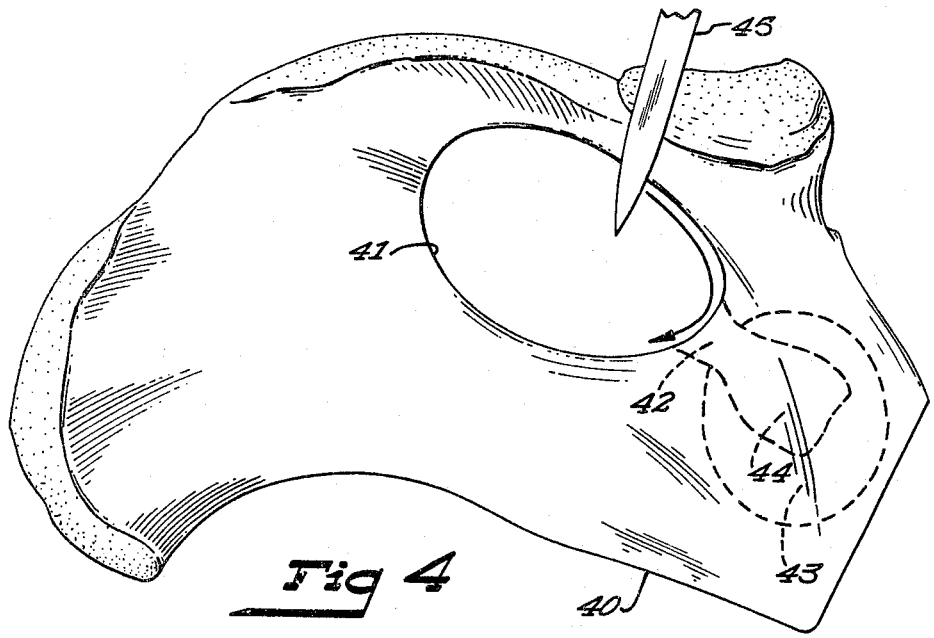
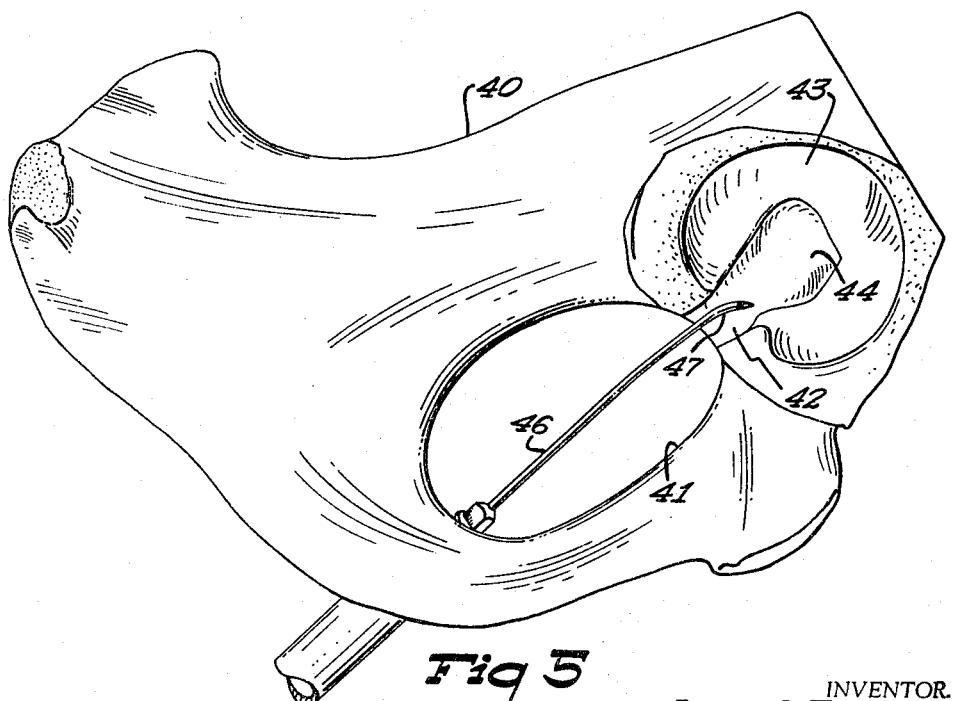
INVENTOR.
LESLIE L. FLAHERTY, SR.
BY
Schroeder & Siegfried
ATTORNEYS United States Patent Office 3,328,171
Patented June 27, 1967

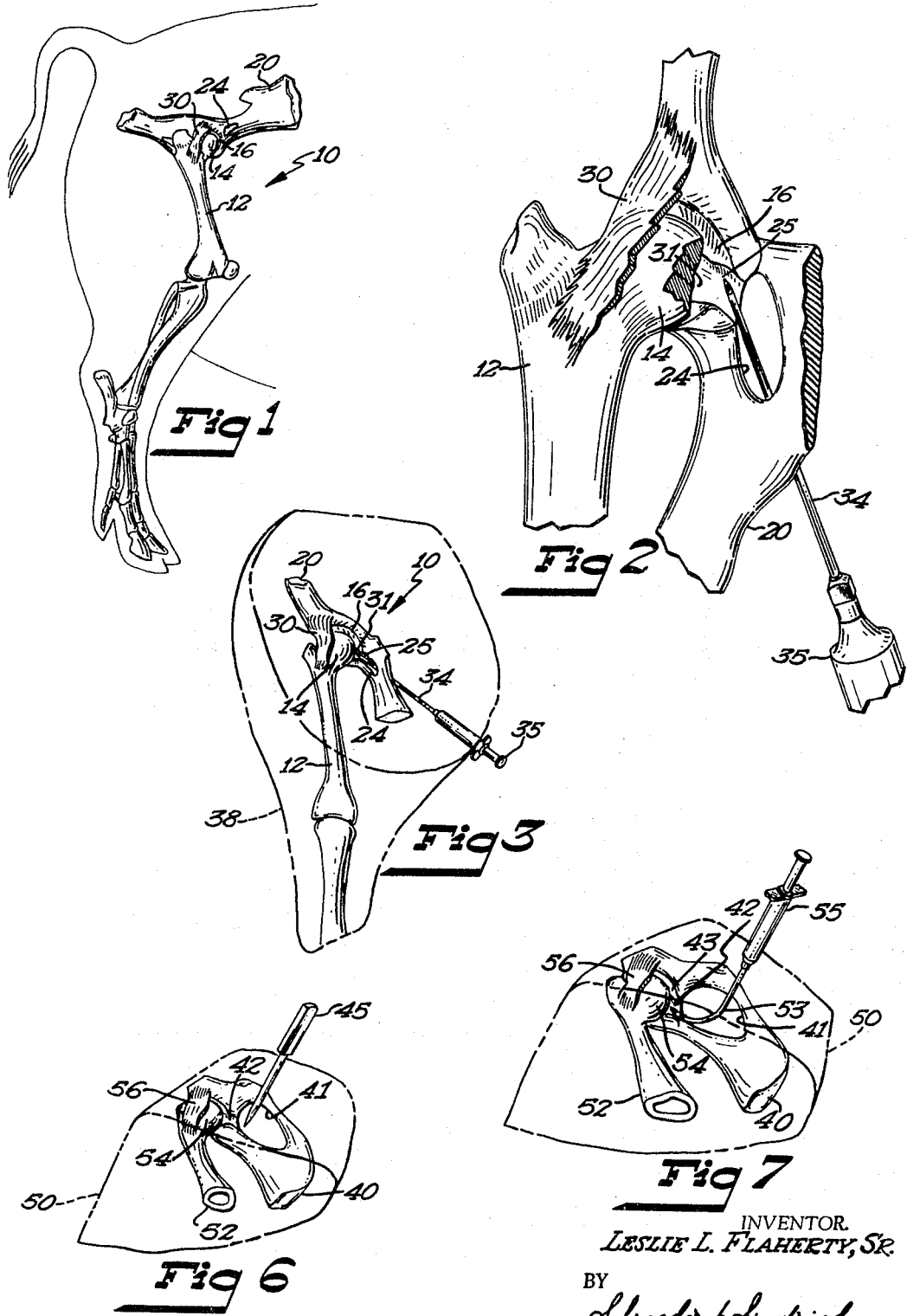

3,328,171
PROCESS OF PRESERVING AN ANIMAL
CARCASS
Leslie L. Flaherty, Sr., Austin, Minn., assignor to
Leslie L. Flaherty, Jr., Austin, Minn.
Filed Jan. 24, 1964, Ser. No. 340,098
5 Claims. (Cl. 99—157)

This invention relates to the process of preserving the meat on animal carcasses for food and more particularly to an improved process of preserving the meat on an animal carcass around the hip joint. This improved preservation process includes a step applicable to all types of preservation processes, that is, the chilling, the cooking, curing or sterilizing of meat carcasses from various animals used for food.

In the preparation of animals for food, the most difficult part of an animal carcass to preserve is the deep seated hip joint. This is particularly true in pork, such as hams, and in beef where the most frequent and severe souring, decay and discoloration is found in and around the hip joint. Such souring, decay and discoloration results from the inability to preserve, cure, chill or heat the area because of the amount of flesh and bone covering the same. The inadequate penetration of the curing agent particularly into the joint capsule of the hip joint permits the bacteria present in the blood and synovial fluid to grow resulting in the taint of the meat surrounding this area. At the present time, the most common preservation method used is chilling, and in the case of deep seated hip joint carcasses, even quick freezing at low temperatures is unsuccessful in preventing such meat spoilage.

At the present time, a number of methods are used to attempt to counteract meat spoilage at the hip joint. In beef carcasses, complicated and costly steps in chilling are used. In the case of whole beef carcasses, deep and sudden chilling is ineffective because of the freezing of the outside layer of the carcass which acts as a barrier to the cooling or preserving medium which results in delaying the preservation process and allowing spoilage of the meat around the hip joint because of bacterial growth.

Various methods have been tried to reach the hip joint of carcasses from the outside of the carcass. These include preservation techniques combining heating or chilling and the introduction of sterilizing or curing agents into the meat. These present day methods require that the curing agent be introduced through the round part of the beef or ham discoloring the flesh and causing damage to the most choice part of the meat. Quite often such methods introduce into the flesh, additional bacteria resulting in greater meat spoilage. Thus, any process of introducing a chilling or cooling medium into the flesh of the carcass which results in impairment of the slicing quality of the meat effects the value of the same with an economic loss to the meat processor.

Curing agents have also been injected into the area outside of the joint of the carcass, but due to the nature of the tissue of the joint capsule membrane, the curing effect resulting therefrom fails to penetrate the interior of the joint capsule so that souring or deterioration still is present. This method where it requires more than one injection or where it requires the circulation of fluid around the hip joint introduces a high cost to the preserving process and generally fails to eliminate the growth of bacteria in the hip joint.

The improved preservation process of the present invention includes a single step of hip joint injection or insertion of a preserving agent through the acetabular notch and into the interior of the joint capsule membrane to introduce the preserving agent into the joint cavity or acetabular fossa and the synovial fluid which substantially reduces all of the above mentioned losses, shortens the normal preservation time and enhances the keeping qualities of the carcass with a greater saving in space and labor as well as improved quality in the meat product. In the improved preservation process, the injection or insertion of a preserving agent in the form of either a liquid, solid or gas into the hip joint cavity of animal carcasses prevents growth of micro-organisms at this point and permits conventional preservation processes to be thereafter carried out to greatly enhance the keeping quality of the meat, either in carcass or dissected form, while substantially reducing the handling and preservation costs. Such a preserving agent is of the type which will substantially dissolve within the membrane in which it is inserted. The improved process includes a step of injecting or inserting through an opening in the hip joint the curing or preserving agent such that it does not substantially disturb the bone and the meat surrounding the hip joint. This step can be done at any time between when the carcass is in a split condition on the killing floor until the carcass is cut into smaller pieces for meat processing. Thus, the improved meat preservation process may be applied to hams and beef hind quarters. The improved process in its preferred form includes the insertion of a syringe with a preserving agent therein from the face side of the aitchbone of the hip joint through the obturator foramen and the acetabular notch into the acetabular fossa, penetrating the joint capsule membrane, and depositing the preserving agent into the joint cavity. The membrane seals itself after withdrawal of the needle of the hypodermic syringe. Thereafter the carcass including the hip joint section may be cured through conventional curing processes of either heating or chilling without the attendant dangers of bacterial growth in the hip joint causing meat spoilage.

Therefore it is the principal object of this invention to provide an improved process for preserving the carcasses of animals for food.

A further object of this invention is to provide an improved preservation process for meat carcasses which includes a step of inserting a preservation agent into the hip joint of the carcass.

A still further object of this invention is to provide an improved preservation process by inserting a preservation agent into the hip joint by way of the aitchbone and through the acetabular notch and the membrane of the hip joint into the acetabular fossa.

These and other objects of this invention will become apparent from a reading of the attached description together with the drawings wherein:

FIGURE 1 is a schematic drawing of the bone structure of the hind leg of a hog,

FIGURE 2 is a schematic drawing of the hip joint with the needle of a syringe inserted into the hip joint, FIGURE 3 is a schematic diagram of a ham showing the bone structure of the hip joint with a hypodermic syringe injecting the hip joint, FIGURE 4 is a schematic diagram of the aitchbone portion of the hip joint of a beef animal indicating an alternate embodiment of the improved preservation process, FIGURE 5 is a schematic diagram of the opposite side of the aitchbone of the beef carcass showing the insertion of a needle or syringe into the hip joint.

FIGURE 6 is a schematic diagram of a portion of a beef hind with the hip joint indicating another alternate embodiment of the improved preservation process, and FIGURE 7 is a schematic diagram of a section of the beef hind in FIGURE 6 showing the insertion of a needle of a hypodermic syringe into the hip joint.

The present invention is directed to an improved step or improved process in the preservation of animal carcasses and in particular is directed to the preservation process of the hip joint or pelvic region of the animal carcass in which the deep seated joints are not readily accessible to or easily affected by conventional preservation methods. This improved process or step will be best understood in connection with the schematic diagram of FIGURE 1 showing in outline the carcass of the side of a hog with the bone structure of the pelvic region and hind leg identified generally at 10. This improved process is shown or explained in connection with hams and beef hind quarters although it will be understood that it is equally applicable to other animal carcasses having an acetabular notch permitting entry into the joint cavity in which deterioration around the pelvic region or hip joint occurs due to the presence of bacteria therein and the ineffectiveness of conventional preservation methods in reducing or eliminating the growth of the bacteria to prevent spoilage of the meat surrounding the same. Thus in FIGURE 1, the bone structure in the hind leg or pelvic region of the hog includes the femur or upper leg bone 12 having a head or knob at the extremity thereof, indicated at 14, which fits into the acetabulum or socket 16 of the hip bone or aitchbone 20. As will be best seen in FIGURE 2, the aitchbone includes an opening or obturator foramen 24 therein adjacent the acetabulum 16 with a depression 25 which is the acetabular notch, filled with a tissue, leading from the obturator foramen into the joint cavity and the acetabular fossa 31 in the joint cavity. Surrounding the femur head 14 and the acetabulum 16 is a membrane, indicated schematically at 30 and partially broken away, which is called the joint capsule membrane. The joint capsule membrane 30 contains the synovial fluid located in the joint cavity and acetabular fossa which acts as a cushion for the end of the femur in the socket or cavity of the aitchbone. In addition, numerous blood vessels extend through the muscles from this area of the hip bone. During normal slaughtering procedure, blood in the vessels in this portion of the leg or carcass is seldom entirely removed and this blood together with the synovial fluid contains bacteria, the growth of which during improper or curing processes causes souring or decay of the meat with attendant discoloration and meat spoilage.

As shown in FIGURE 2, the improved step in the preservation process of the animal carcass includes the insertion of a preservative agent into the area within the joint capsule membrane through a passage or the acetabular notch which does not substantially disturb the bones or the meat surrounding the same to eliminate the possibility of bacteria increase or the introduction of new bacteria as well as defacing of the meat product in the animal carcass. Thus, as will be seen in FIGURE 2, the hollow tubular member 34, such as a needle on a hypodermic syringe, will be introduced into the animal carcass in the preferred embodiment through a path which starts from the face side of the aitchbone or that side opposite the femur 12 is connected. This surface is on the interior side of the carcass and remote from the deep seated meat tissue in which spoilage or defacement is to be prevented. The introduction of this tubular member 34 in FIGURE 2, extends through the obturator foramen 24 or the hole in the aitchbone and along the back face of the aitchbone to the acetabular notch 25. This notch is filled with a relatively soft tissue which may be readily punctured with a hypodermic needle or a tubular member to permit passage of the member therethrough into the joint capsule membrane and into the acetabular fossa 31. The puncture of the needle or hollow tubular member in the joint capsule membrane 30 is such as to prevent flow of the synovial fluid therein into the surrounding meat area. A preserving agent, which may be either a liquid or gas or of a solid nature, will be injected into the joint cavity. The preserving agent will cause cooling or preservation in the joint capsule, reducing bacterial growth or eliminating the same to preserve the meat and prevent spoilage from starting in this portion of the carcass. The preservation agent will be introduced under pressure, such as from the hypodermic syringe 35 or equivalent structure, such that the preservation agent is forced through and contained by the joint capsule membrane 30. Upon withdrawal of the needle, the joint capsule membrane 30 will naturally seal itself, retaining the fluid therein, and the needle will be withdrawn from the animal carcass without defacing the saleable meat product.

This initial step in the preservation process may be instituted in connection with the animal carcass when it has been cut into halves, such as the half of a hog or beef animals, and the improved preservation procedure or process may be employed at this time since the entrance area into the pelvic region is accesible without further cutting or slicing of the carcass into meat products. It may be also employed in connection with hogs and particularly, the hams therefrom, such as is shown in FIGURE 3, prior to the conventional curing process. Thus, as in FIGURE 3, the ham is shown schematically in phantom at 38 with the hip joint structure or that part of the aitchbone and femur remaining therein being shown in solid. The insertion of a suitable tubular member to provide a passage for the preservation agent into the hip joint socket and the joint capsule membrane is readily available with the animal carcass in this sliced or cut condition. Since the bone structure of the ham is identical with that shown in FIGURES 1 and 2, reference to the same in connection with the ham specifically is omitted for simplicity. This improved step in the preservation of animal carcasses is particularly applicable in connection with hams since spoilage therein from the souring of the hip joint is common and operates to greatly effect the quality of the meat product resulting therefrom. Thus, in the preferred embodiment, the improved process includes the introduction of the needle of a hypodermic syringe with a suitable amount of preserving fluid, the quantity of which will depend upon the weight of the meat product involved, through the bone structure as outlined above and into the joint capsule membrane to be contained thereby for curing the flesh and blood in the joint cavity in this deep seated portion of the meat product. Thereafter, any conventional curing process such as freezing, heating, or equivalent processes in the case of hams, may be employed without deterioration of the meat product or the taste of the same from bacterial growth in the hip joint. Such a preservation process greatly enhances the retaining quality of the meat product involved.

FIGURES 4 and 5 of the drawings disclose the aitchbone portion of a beef carcass with the femur removed. In FIGURE 4, the aitchborne indicated generally at 40 has an obturator foramen 41 therein from which the acetabular notch 42 extends toward the acetabulum 43. The obturator fossa or depression 44 in the socket or acetabulum 43 connects through the socket to the notch 42 to provide the passage which is normally filled with a flesh material but is readily punctured to permit entrance into the joint cavity of the aitchbone. The preservation of the meat product for the beef carcass may be accomplished in the same manner as in the connection with the ham shown in the beforementioned embodiment by the introduction of the preserving agent into the hip joint cavity of the aitchbone of the carcass through the acetabular notch and into the cavity or acetabular fossa. The joint capsule membrane surrounding the acetabulum and femur head will be penetrated by the introduction of a syringe 46 through the acetabular notch such that the preserving agent may be deposited with the joint capsule membrane. As in the case of the ham, the amount and type of preservation agent will depend upon the physical size of the meat product and the type of curing process to be employed. In the case of beef carcasses, a slightly varied shape in the hip bones makes it desirable that the needle or syringe have a slight curve 47 at the end of the same in order to facilitate entrance of the needle or tubular member from the face side of the aitchbone through the obturator foramen and acetabular notch. Thus, as in the preferred embodiment, the desired entrance in the case of the beef carcass in whole or sliced form is from the face or interior wall which is the face side of the aitchbone. The curved syringe or tubular member 46 may be inserted through the portion of the meat product to probe the obturator foramen 41 and thereby provide entrance through the acetabular notch 42 into the acetabular fossa 44.

In FIGURE 4, an alternate embodiment is suggested through the use of a small boning knife 45 which will be inserted into the meat product from the face side of the aitchbone to probe the obturator foramen 41 and allow for slicing of the meat adjacent the obturator foramen as the knife describes an arcuate path around the obturator foramen adjacent the acetabular notch 42. Thus, the acetabular notch 42 may be readily located and the tubular member 46 or syringe may be inserted through the portion of the carcass cut by the boning knife to pass through the obturator foramen 41 and the acetabular notch 42 to gain entrance through the joint capsule membrane (not shown) into the acetabular fossa 44 within the acetabulum 43. Thus, the preserving agent may be deposited within the joint capsule membrane and into the joint cavity for preserving the tissue and blood therein. FIGURE 5 shows the opposite side of the aitchbone displaying the acetabulum 43 with the introduction of the tubular member 46 or needle from the hypodermic syringe through the obturator foramen 41, the acetabular notch 42 and into the acetabular fossa 44.

In FIGURES 4 and 5, only the aitchbone portion of the pelvic section of the beef carcass was shown for identication of the acetabular notch and acetabular fossa. In FIGURES 6 and 7 of the drawings, a portion of a hind quarter of a beef carcass is shown in phantom at 50 with an aitchbone structure and a portion of the femur 52 and head 54 similar to that of the ham. Preservation of the sliced meat product may be accomplished by the introduction of a preserving agent into the hip joint cavity through the acetabular notch 42 and into the joint capsule membrane 56 and the acetabular fossa 44, as described above. FIGURES 6 and 7 show a third embodiment of the process which indicates that the actual entrance into the acetabular fossa 44 through the acetabular notch 42 may be made from the opposite face of the aitchbone 40 and with a slightly different construction of the syringe 55 with a curved tubular member 53 or needle. Thus, in FIGURE 6, the small boning knife 45 is inserted from the side of the aitchbone 40 common to the femur 52 and a deep vertical cut is made through the meat product to the aitchbone 40 and along the aitchbone adjacent the obturator foramen 41. This cut will follow the obturator foramen and locate the acetabular notch 42 from the side of the aitchbone opposite the face side to permit introduction of the curved needle 53 attached to the syringe 55 to permit the curved tubular member to enter a curved path through the acetabular notch 42 and into the acetabular fossa 44 and the joint capsule membrane 56 of the joint cavity. This alternate entrance passage while it affects part of the valuable meat product of the hip joint in the case of the beef carcass, facilitates a slightly greater accessibility to the acetabular notch and hence the acetabular fossa.

Varied shapes in the bone structures occurring in other types of animal carcasses will determine the best entrance passage and process for the introduction of the preserving agent to the joint cavity of the carcass involved. The preferred embodiment of approaching the joint cavity from the face side of the aitchbone through the obturator foramen and acetabular notch in most instances will provide the best method of preservation of the meat of the joint cavity without disturbing the valuable meat product or defacing the same.

In each of the above cases, the preservation of the hip joint by the insertion of the preservation agent into the joint cavity thereof via the acetabular notch is done with a minimum of time and expense to greatly reduce or eliminate any special handling or preserving procedures. Thereafter, any conventional preservation process such as heating, cooling, or curing will produce a resulting meat product therefrom which will have greater retaining qualities, be enhanced in taste and color and will have eliminated therefrom any chance of spoilage in the deep seated hip joint. Therefore, in considering this invention, it should be remembered that the present disclosure is illustrative only and the scope of the invention should be determined by the appended claims.

I claim:
1. The process of preserving an animal carcass for food after slaughter which includes an initial step of dissecting the carcass, preserving the meat in and around the hip joint of the animal carcass by the injection of a preservative agent through the acetabular notch of the aitchbone into the acetabular fossa penetrating the joint capsule membrane, depositing a preservative agent within the joint capsule membrane of the hip joint, and thereafter preserving the carcass of the animal in a conventional manner.

2. The process of preserving an animal carcass for food after slaughter which includes an initial step of dissecting the carcass, preserving the meat in and around the hip joint of the animal carcass by making an entrance passage through the acetabular notch and into the acetabular fossa within the joint capsule membrane of the hip joint, thereafter introducing a preservative agent through the passage and into the acetabular fossa within the joint capsule membrane, and thereafter preserving the carcass of the animal in a conventional manner.

3. The process of preserving a dissected animal carcass for food through the use of a hollow tubular member which includes the initial step of dissecting the carcass, making a passage with the hollow tubular member into the carcass surrounding the hip joint from the face side of the aitchbone through the obturator foramen and the acetabular notch into the joint capsule membrane of the acetabular fossa, forcing a preservative agent through the hollow tubular member into the joint capsule membrane, withdrawing the hollow tubular member from the membrane which seals itself from the carcass, and thereafter preserving the remainder of the carcass through a conventional preservative method.

4. The process of preserving a dissected animal carcass for food through the use of a hypodermic syringe which includes the initial step of dissecting the carcass, making a passage with the hypodermic syringe into the carcass surrounding the hip joint from the face sides of the aitchbone through the obturator foramen and the acetabular notch into the joint capsule membrane of the acetabular fossa, forcing a preservative agent through the hypodermic syringe into the joint capsule membrane, withdrawing the hypodermic syringe from the membrane which seals itself from the carcass and thereafter preserving the remainder of the carcass through a conventional preservative method.

5. The process of preserving a dissected animal carcass for food through the use of a curved tubular member which initial step includes cutting a passage through the carcass surrounding the hip joint from a side opposite the face side of the aitchbone to the obturator foramen and along the curved portion of the obturator foramen to the acetabular notch, forcing the curved tubular member into the passage and directing it through the acetabular notch and into the joint capsule membrane of the acetabular fossa, forcing a preservative agent into the joint capsule membrane through the curved tubular member, withdrawing the curved tubular member, and thereafter preserving the remaining portion of the carcass through conventional preserving methods.

References Cited

UNITED STATES PATENTS

| | | |
|---|---|---|
| 390,170 | 9/1888 | Humaston. |
| 609,799 | 8/1898 | Flinn. |
| 2,942,982 | 6/1960 | Wrenshall et al. ____ 99—157 X |
| 2,942,986 | 6/1960 | Williams _____ 99—157 X |

A. LOUIS MONACELL, *Primary Examiner.*

H. LORD, *Assistant Examiner.*